United States Patent
Ogawa

(10) Patent No.: US 12,529,476 B2
(45) Date of Patent: Jan. 20, 2026

(54) PREMIXING DEVICE AND COMBUSTION DEVICE INCLUDING THE SAME

(71) Applicant: NORITZ CORPORATION, Hyogo (JP)

(72) Inventor: Kyohei Ogawa, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 378 days.

(21) Appl. No.: 18/451,111

(22) Filed: Aug. 17, 2023

(65) Prior Publication Data
US 2024/0077201 A1 Mar. 7, 2024

(30) Foreign Application Priority Data
Sep. 2, 2022 (JP) .................................. 2022-139694

(51) Int. Cl.
*F23D 14/02* (2006.01)
*F23D 14/62* (2006.01)
*F23D 14/70* (2006.01)

(52) U.S. Cl.
CPC .............. *F23D 14/62* (2013.01); *F23D 14/02* (2013.01); *F23D 14/70* (2013.01)

(58) Field of Classification Search
CPC ........... F23D 14/62; F23D 14/02; F23D 14/70
USPC ........................................................ 431/354
See application file for complete search history.

(56) References Cited

U.S. PATENT DOCUMENTS

| 2,244,821 | A | * | 6/1941 | Bloom | F23D 11/00 |
| | | | | | 431/181 |
| 3,885,003 | A | * | 5/1975 | Kobayashi | F02M 11/02 |
| | | | | | 123/216 |
| 9,677,759 | B2 | | 6/2017 | Zatti et al. | |
| 10,012,382 | B2 | * | 7/2018 | Hilber | F23K 3/02 |
| 2004/0231572 | A1 | * | 11/2004 | Ohtani | F23K 3/02 |
| | | | | | 110/261 |
| 2015/0050608 | A1 | * | 2/2015 | Min | F23D 14/02 |
| | | | | | 431/354 |

FOREIGN PATENT DOCUMENTS

| CA | 3041589 A1 | * | 11/2019 | ............. F23D 14/62 |
| JP | 2021099204 | | 7/2021 | |

OTHER PUBLICATIONS

Machine Translation of CA-3041589 dated Apr. 29, 2019.*

* cited by examiner

*Primary Examiner* — Avinash A Savani
(74) *Attorney, Agent, or Firm* — JCIPRNET

(57) ABSTRACT

A premixing device includes first and second fuel gas outlets through which fuel gas is capable of flowing out to first and second flow paths partitioned by a partition wall part of a premixing flow path, using a negative pressure generated by an air flow in the first and second flow paths. The premixing device further includes: a first blade part that is provided in the first flow path and includes the first fuel gas outlet provided facing a downstream side in an air flow direction; a flapper that has an opening degree changing according to an air flow rate and opens and closes both the first flow path and the first fuel gas outlet; and a pair of fin parts that protrude at the flapper to sandwich the first fuel gas outlet and the first blade part, and form a gap with respect to the first blade part.

12 Claims, 10 Drawing Sheets

PREMIXING DEVICE AND COMBUSTION DEVICE INCLUDING THE SAME

CROSS-REFERENCE TO RELATED APPLICATION

This application claims the priority benefit of Japan application serial no. 2022-139694, filed on Sep. 2, 2022. The entirety of the above-mentioned patent application is hereby incorporated by reference herein and made a part of this specification.

BACKGROUND

Technical Field

The disclosure relates to a premixing device and a combustion device including the same. Herein, "premixing" refers to a process of generating a combustible mixed gas by mixing air and fuel gas in advance for the purpose of performing premixing combustion.

Related Art

Patent Document 1 (Japanese Patent Application Laid-Open No. 2021-99204) has disclosed a specific example of a premixing device. The premixing device described in Patent Document 1 includes a premixing flow path in a Venturi shape that has one end side opened to outside and the other end side connected to an air suction side of a fan, and when the fan is driven, outside air is caused to flow in from an opening on the one end side to flow in a predetermined direction. The premixing flow path is partitioned into a first flow path and a second flow path by a partition wall part, and a first fuel gas outlet and a second fuel gas outlet are respectively provided at inner peripheral wall surfaces of the first flow path and the second flow path. Further, a flapper capable of swinging to open and close the first flow path is provided in the first flow path. An opening degree of the flapper changes according to an air flow rate of the first flow path such that the opening degree is smaller in the case where the air flow rate is low than in the case where the air flow rate is high.

In such a premixing device, with air flowing in the premixing flow path and a negative pressure acting on the first fuel gas outlet and the second fuel gas outlet, fuel gas flows out from the first fuel gas outlet and the second fuel gas outlet to the premixing flow path. The fuel gas is mixed with the air to generate mixed gas. On the other hand, in the case where the air flow rate is low, the flapper closes the first flow path of the premixing flow path. Thus, the air flow speed in the second flow path increases and the negative pressure acting on the second fuel gas outlet is strengthened. As a result, even in the case where the air flow rate is low, an appropriate amount of fuel gas can be caused to flow out from the second fuel gas outlet due to the negative pressure. Such an action is effective in increasing a turndown ratio.

However, in the conventional art, there is still room for improvement as described below.

That is, when the flapper changes from a closed state to an open state, an effective flow path area of the premixing flow path changes suddenly. Thus, under this influence, there is a risk that the speed of an air flow that has been generated in the second flow path may drop suddenly. Accordingly, there is a risk that a mixing ratio of the mixed gas may also change suddenly, and the mixed gas may become an inappropriate fuel lean mixing ratio.

Further, the flapper only opens and closes the first flow path, and the first fuel gas outlet remains open. Thus, for example, even if the first flow path is switched from an open state to a closed state by the flapper, there is a risk that fuel gas would flow out from the first fuel gas outlet over a period of time afterwards. In addition, there is also a risk that the air of the first flow path may flow into (backflow) the first fuel gas outlet or fuel gas may unnecessarily flow out from the first fuel gas outlet due to pressure fluctuations in the first flow path caused by the influence of the air flow of the second flow path. Accordingly, it is difficult to maintain the mixture gas at a desired appropriate mixing ratio. As a means for solving this, an additional flapper is further provided to open and close the first fuel gas outlet (see Patent Document 2: U.S. Pat. No. 9,677,759). However, according to such a means, since two flappers respectively for the first flow path and the first fuel gas outlet are used, the total number of parts increases and the production costs thereof become high.

Furthermore, in the conventional art (Patent Documents 1 and 2), for example, in the case where the opening degree of the flapper is not very large and the air flow rate of the first flow path is relatively small, since the air flow of the first flow path is slow, it is difficult to apply a strong negative pressure to the first fuel gas outlet. Thus, in such a case, there is a risk that the amount of fuel gas flowing out from the first fuel gas outlet may be insufficient and the mixing ratio may be inappropriate.

SUMMARY

A premixing device provided according to a first aspect of the disclosure includes: a premixing flow path to which air is supplied from outside and which serves to mix fuel gas with the air to generate a mixed gas; a partition wall part that partitions the premixing flow path into a first flow path and a second flow path arranged side by side in a direction intersecting with an air flow direction; and a first fuel gas outlet and a second fuel gas outlet from which fuel gas is capable of flowing out to the first flow path and the second flow path using a negative pressure generated by an air flow in the first flow path and the second flow path. The premixing device further includes: a first blade part that is provided in the first flow path and includes the first fuel gas outlet provided facing a downstream side in the air flow direction; a flapper that is arranged on the downstream side of the first blade part in the air flow direction in the first flow path, is capable of swinging to open and close both the first flow path and the first fuel gas outlet, and has an opening degree which changes according to an air flow rate of the premixing flow path such that the opening degree is smaller in a case where the air flow rate is low than in a case where the air flow rate is high; and a pair of fin parts that are provided to protrude at the flapper in an arrangement of sandwiching the first fuel gas outlet and the first blade part in a direction intersecting with the air flow direction, the pair of fin parts forming a gap with respect to the first blade part through which air is capable of passing.

According to such a configuration, in the case where the air flow rate supplied to the premixing flow path is low, the first flow path turns into a state closed by the flapper, and fuel gas flowing out from the second fuel gas outlet is mixed with the air flowing through the second flow path. On the other hand, in the case where the air flow rate is high, air also flows in the first flow path, and fuel gas flowing out from the first fuel gas outlet is mixed with the air. Thus, similar to Patent Document 1, it is possible to increase a turndown ratio. Furthermore, according to the disclosure, the following effects can be obtained. Firstly, the flapper not only opens and closes the first flow path but is also capable of opening and closing the first fuel gas outlet. Thus, when the first flow path is in the closed state, the first fuel gas outlet is also in the closed state at the same time, and it is possible to appropriately prevent unnecessary fuel gas outflow from the first fuel gas outlet afterwards. As a means for achieving this, since it is not necessary to use two flappers respectively for the first flow path and the first fuel gas outlet, it is possible to simplify the overall configuration and reduce the production costs. Secondly, in the case where the flapper changes from the closed state to the open state, at a stage of start of opening of the flapper, a part of the first flow path is still blocked by the pair of fin parts, and it is possible to substantially prevent a sudden change in an effective flow path area of the premixing flow path. Thus, when the flapper changes from the closed state to the open state, it is possible to prevent a sudden drop in the speed of an air flow that has been generated in the second flow path. As a result, it is possible to appropriately suppress the mixing ratio of the mixed gas from becoming an inappropriate fuel lean mixing ratio. Thirdly, in the case where the first fuel gas flow path and the second fuel gas flow path are configured to communicate with each other, there is a risk that when the flapper changes from the closed state to the open state, the air of the first flow path may flow back to the first fuel gas flow path and the second fuel gas flow path from the first fuel gas outlet due to a negative pressure generated in the second flow path. In contrast, in the disclosure, the pair of fin parts generate resistance against such an air flow. Thus, the phenomenon of backflow is also suppressed, and the mixed gas is more appropriately suppressed from becoming an inappropriate fuel lean mixing ratio. Fourthly, when the flapper changes from the closed state to the open state, it is possible to generate a fast air flow at a gap between the pair of fin parts and the first blade part. Further, this air flow can be generated in the vicinity of two sides of the first fuel gas outlet. Thus, a strong negative pressure can be applied to the first fuel gas outlet, and it is possible to sufficiently ensure the amount of fuel gas flowing out to the first flow path. Thus, the mixed gas is more reliably suppressed from becoming an inappropriate fuel lean mixing ratio.

In an embodiment of the disclosure, in a view in a direction of a line of a swing center of the flapper, a tip part of each of the fin parts in at least a region near the flapper may have an arc shape centered on the swing center, and a radius of the arc shape may be equal to or greater than a distance from the swing center to the first fuel gas outlet.

According to such a configuration, in the case where the flapper starts to swing from the closed state to the open state, at least a region of each fin part near the flapper can be reliably arranged on two sides of the first fuel gas outlet and the first blade part, and the intended action of the disclosure can be appropriately obtained. On the other hand, as a means for obtaining such an action, it is possible to eliminate the need to form each fin part in an unnecessarily large size or a complex shape.

In an embodiment of the disclosure, in a fully open state of the flapper, each of the fin parts may be positioned on the downstream side of the first blade part in the air flow direction and not present on two sides of the first blade part.

According to such a configuration, the following effects can be obtained. That is, in the case where the air flow rate in the first flow path becomes considerably high and the flapper is in the fully open state, if each fin part is still positioned on two sides of the first blade part, each fin part would become a large resistance that obstructs the air flow. According to this configuration, it is possible to appropriately prevent this issue. If the air flow rate in the first flow path increases as the flapper turns into the fully open state, since the speed of this air flow is originally high and a strong negative pressure can be generated, even if a gap is not formed between each fin part and the first blade part, it is possible to appropriately cause an appropriate amount of fuel gas to flow out from the first fuel gas outlet.

In an embodiment of the disclosure, the premixing device may further include: a protruding step part that is provided at a peripheral wall inner surface part of the first flow path and partially protrudes closer to a center of the first flow path than a remaining general portion of the peripheral wall inner surface part; and a support member that is attached to the protruding step part to be arranged in the first flow path, and swingably supports the flapper.

According to such a configuration, since the flapper can be swingably supported using the support member arranged in the first flow path, it contributes to achieving overall compactness. Unlike the above configuration, in the case where the support member of the flapper is attached outside the first flow path, a sealing means would be required to prevent leakage of fuel gas to outside. However, according to the above configuration, such a need can be eliminated.

In an embodiment of the disclosure, the premixing device may further include: a premixing flow path forming member that forms the premixing flow path; a second blade part that is provided in the second flow path with one end connected to a peripheral wall part of the premixing flow path forming member and another end connected to the first blade part via the partition wall part, and includes the second fuel gas outlet provided facing the downstream side in the air flow direction; a fuel gas receiving part that is provided at the peripheral wall part of the premixing flow path forming member and receives supply of fuel gas from outside; a second fuel gas flow path that is provided in the second blade part in a manner capable of guiding a part of the fuel gas supplied to the fuel gas receiving part to the second fuel gas outlet; and a first fuel gas flow path that is provided to extend from inside the second blade part to inside the first blade part in a manner capable of guiding another part of the fuel gas supplied to the fuel gas receiving part to the first fuel gas outlet.

According to such a configuration, it is possible to appropriately and rationally guide fuel gas from the fuel gas receiving part provided at an outer surface part of the premixing flow path forming member to the first fuel gas outlet and the second fuel gas outlet using the first fuel gas flow path and the second fuel gas flow path provided in the first blade part and the second blade part. The fuel gas receiving part may be provided at one spot, and it is not necessary to provide a plurality of fuel gas receiving parts respectively corresponding to the first fuel gas outlet and the second fuel gas outlet. Thus, it is suitable for simplifying the overall configuration and reducing the production costs. Further, in the above configuration, the configurations of the second blade part and the second fuel gas outlet provided at the second blade part are made similar to the configurations of the first blade part and the first fuel gas outlet provided at the first blade part. When air flows in the vicinity of the first blade part and the second blade part, such a configuration contributes to effectively generating a negative pressure and strongly applying the negative pressure to the first fuel gas outlet and the second fuel gas outlet to sufficiently ensure the outflow amount of fuel gas.

In an embodiment of the disclosure, a thickness of the second blade part in the air flow direction may be greater than that of the first blade part, and the first fuel gas flow path and the second fuel gas flow path may be provided in an arrangement of overlapping with each other in the air flow direction in the second blade part.

According to such a configuration, it is possible to suppress the first blade part and the second blade part from becoming a wide shape (a shape with a wide width in a direction intersecting with the air flow direction) and ensure flow path opening areas of the first flow path and the second flow path, while appropriately providing the first fuel gas flow path and the second fuel gas flow path in the first blade part and the second blade part.

A combustion device provided according to a second aspect of the disclosure includes: a fan; a premixing device that is provided on an air suction side of the fan, generates a mixed gas obtained by mixing air and fuel gas, and sends the mixed gas to the fan; and a burner that receives supply of the mixed gas from the fan and burns the fuel gas. The premixing device provided according to the first aspect of the disclosure is used as the premixing device.

According to such a configuration, the same effects as described for the premixing device provided according to the first aspect of the disclosure can be obtained.

Other features of the disclosure will become more apparent from the description of embodiments of the disclosure provided below with reference to the accompanying drawings.

DESCRIPTION OF THE EMBODIMENTS

Embodiments of the disclosure provide a premixing device and a combustion device including the same capable of increasing a turndown ratio and achieving excellent performance in maintaining a mixed gas at an appropriate mixing ratio by means of a simple configuration.

Hereinafter, exemplary embodiments of the disclosure will be described with reference to the drawings.

Figure 1:
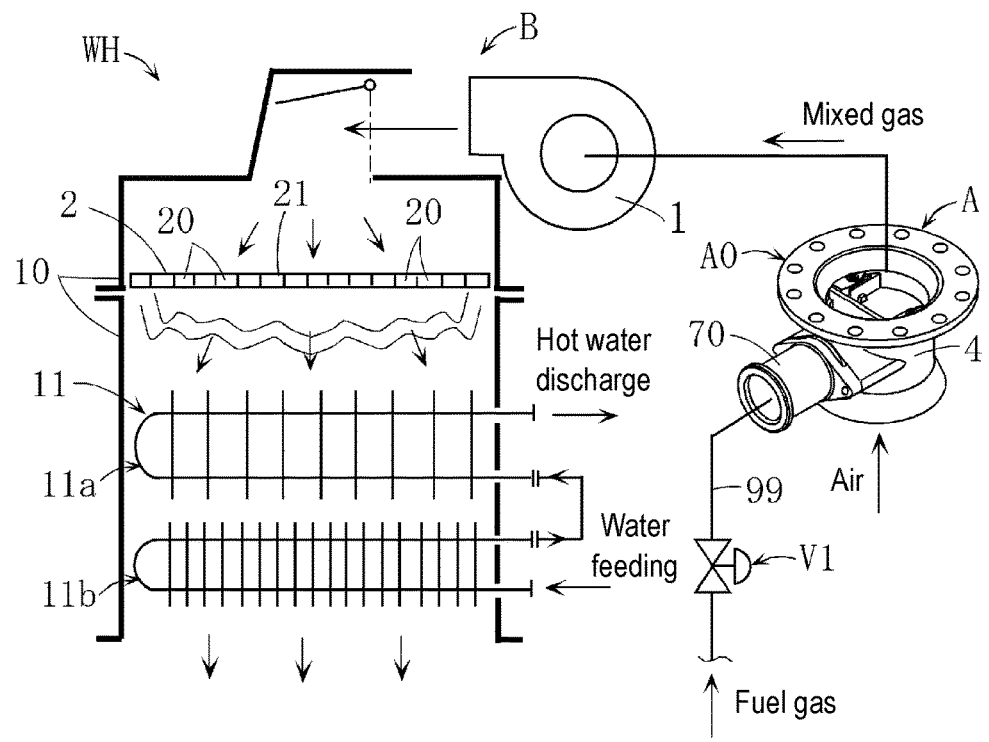
FIG. 1 is a schematic view illustrating an example of a combustion device including a premixing device according to the disclosure.
Figure 2:
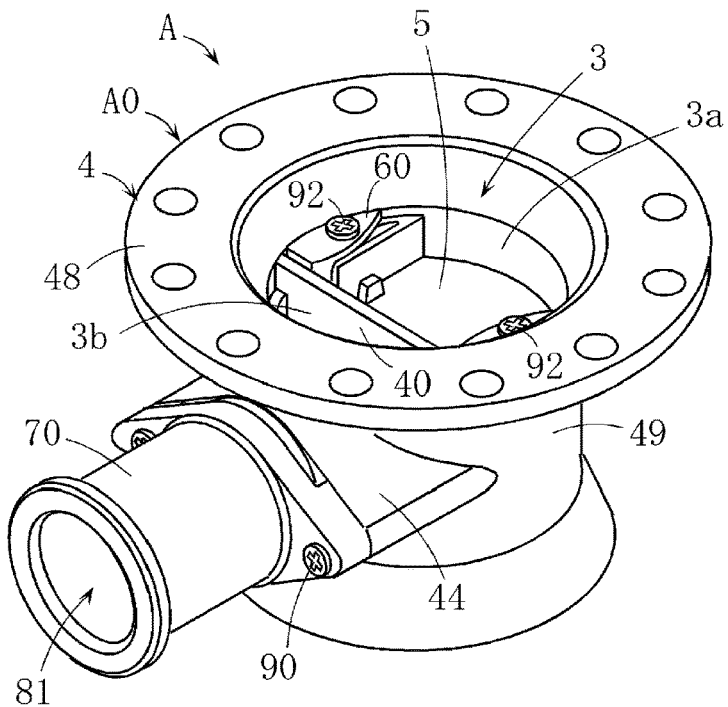
FIG. 2 is an external perspective view of the premixing device in FIG. 1.

FIG. 1 shows a hot water apparatus WH. The hot water apparatus WH is a hot water supply apparatus, and is composed of a premixing device A, a combustion device B (premixing combustion device) configured by combining a fan 1 and a burner 2 with the premixing device A, and a primary heat exchanger 11a and a secondary heat exchanger 11b combined with the combustion device B.

Details of the premixing device A will be described later. Using the premixing device A, a mixed gas (combustible mixed gas) of air and fuel gas is generated, and this mixed gas is supplied to the burner 2 through the fan 1. The burner 2 is configured with a porous plate 21 having a plurality of ventilation holes 20 (burner ports), and is accommodated in a case 10. The burner 2 is attached with an ignition plug (not shown) and a flame detection sensor (not shown). The mixed gas passes through the plurality of ventilation holes 20 and burns below the porous plate 21. The combustion gas generated by the burner 2 sequentially acts on the primary heat exchanger 11a for sensible heat recovery and the secondary heat exchanger 11b for latent heat recovery, and hot water passing through inside of the primary heat exchanger 11a and the secondary heat exchanger 11b is heated. Accordingly, hot water is generated and the hot water is supplied to a desired hot water supply destination.

As clearly shown in FIG. 2 to FIG. 4C, the premixing device A includes a device main body A0, a flapper 5 attached to the device main body A0, and a pair of left and right support members 60 and a shaft body 61 that swingably support the flapper 5.

The device main body A0 includes a premixing flow path forming member 4 and a pipe body joint part 70. The premixing flow path forming member 4 includes a tubular part 49 that forms therein a premixing flow path 3 in a Venturi shape, a flange part 48 connected to an upper end of the tubular part 49, and a pedestal part 44 in a step shape provided to protrude from an outer surface part of the tubular part 49. The pipe body joint part 70 is attached to the pedestal part 44 using a screw member 90 such as a screw to sandwich a fuel gas control plate 71 (to be described later).

As shown in FIG. 1, in the premixing device A, the pipe body joint part 70 is connected to a gas pipe 99, and the premixing device A receives supply of fuel gas from a fuel gas supply part (not shown) through a pressure equalizing valve (zero governor) V1. On the other hand, the premixing device A is directly connected to an air suction side of the fan 1 using the flange part 48 or is indirectly connected via a piping. Upon driving of the fan 1, outside air flows into the premixing flow path 3 from one end opening of the premixing flow path 3 and flows toward the other end opening. Due to a negative pressure action caused by this air flow, fuel gas flows out from a first fuel gas outlet 80a and a second fuel gas outlet 80b (to be described later) to the premixing flow path 3, and a mixed gas of air and fuel gas is generated and sucked by the fan 1.

Figure 4A:
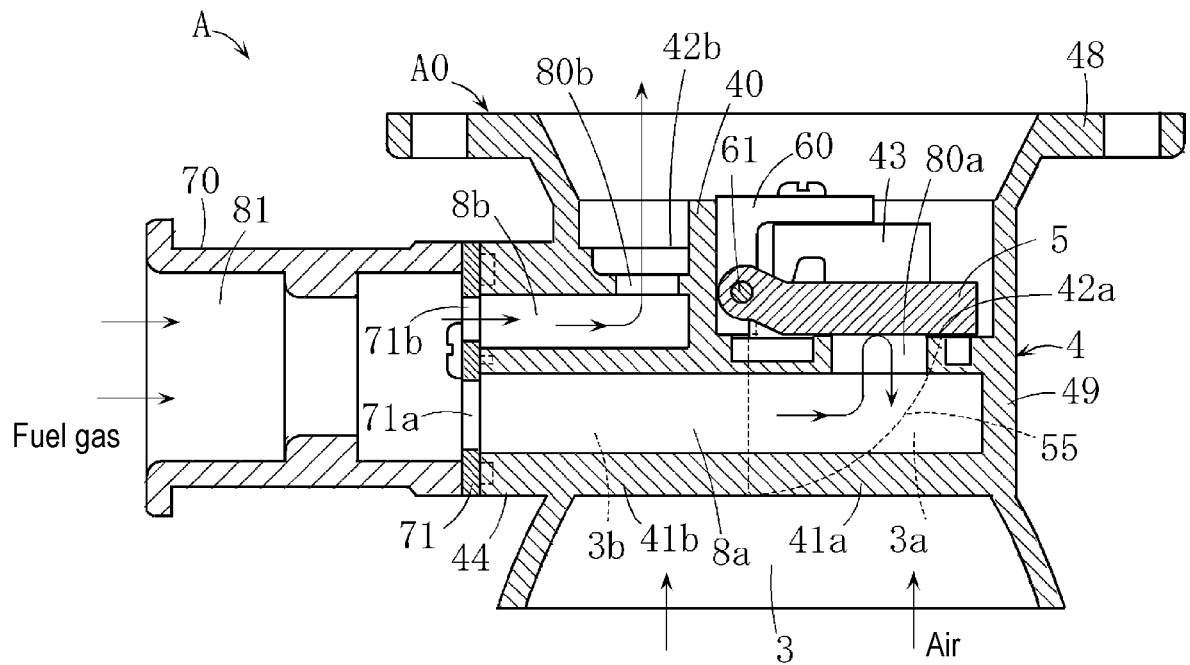
FIG. 4A is a front cross-sectional view of the premixing device shown in FIG. 1.
Figure 4B:
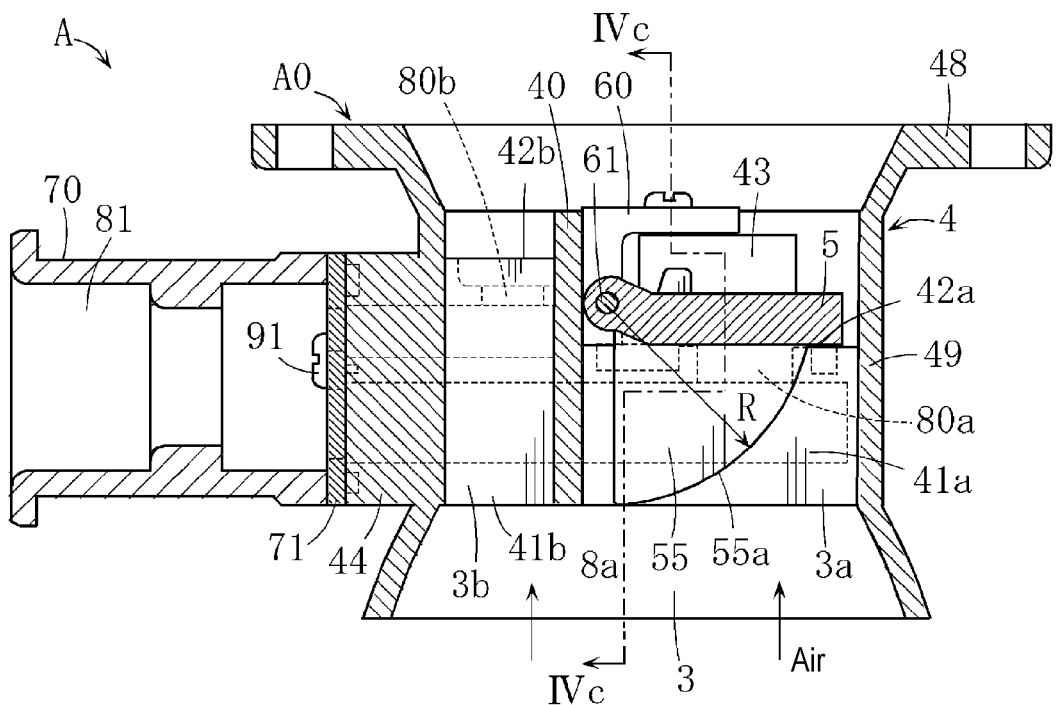
FIG. 4B is a cross-sectional view of the premixing device taken at a part different from FIG. 4A.

As clearly shown in FIG. 4B, a partition wall part 40 extending in an up-down height direction (corresponding to an air flow direction) is provided at the premixing flow path 3, and a part of the premixing flow path 3 is partitioned by the partition wall part 40 into a first flow path 3a and a second flow path 3b arranged side by side in a horizontal direction (corresponding to an example of a direction intersecting with the air flow direction). The first flow path 3a and the second flow path 3b may have a same volume, but in this embodiment, the partition wall part 40 is arranged to be biased to the left side of FIG. 4B from a central part of the premixing flow path 3, and the volume of the second flow path 3b is smaller than the volume of the first flow path 3a.

Figure 7A:
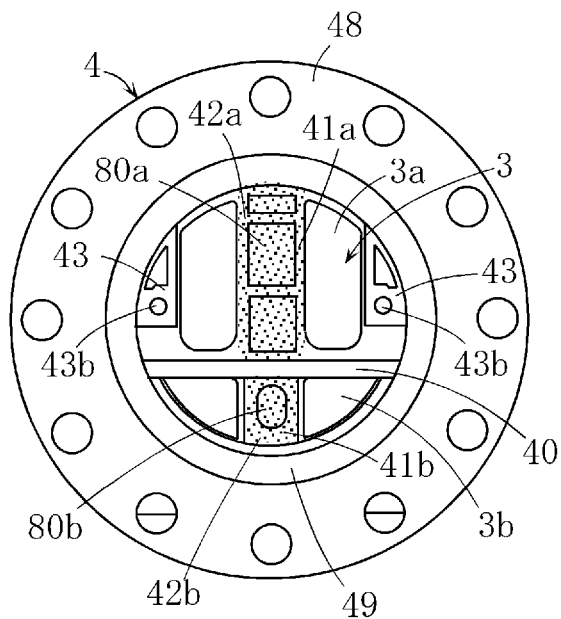
FIG. 7A is a plan view of a premixing flow path forming member of the premixing device shown in FIG. 2 and FIG. 3.
Figure 7B:
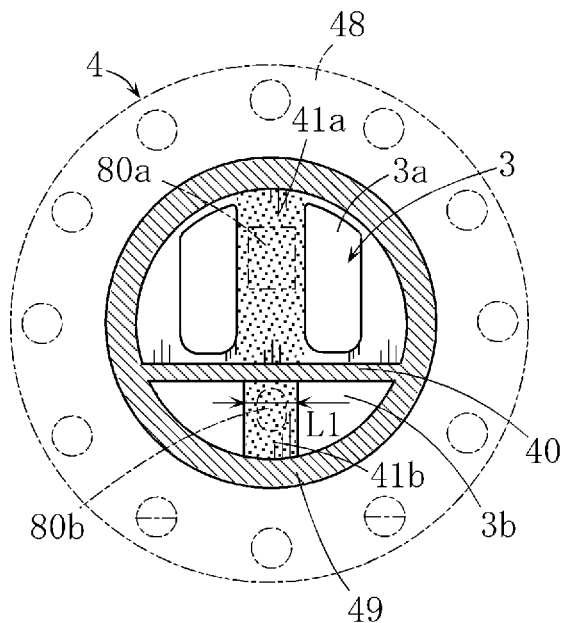
FIG. 7B is a plan cross-sectional view thereof.

As clearly shown in FIG. 4A, FIG. 7A, and FIG. 7B, a first blade part 41a and a second blade part 41b (hatched portions in FIG. 7A and FIG. 7B) provided with the first fuel gas outlet 80a and the second fuel gas outlet 80b are further provided at the premixing flow path 3. The first blade part 41a and the second blade part 41b extend to respectively cross the first flow path 3a and the second flow path 3b in the horizontal direction. One end of each of the first blade part 41a and the second blade part 41b is connected to a peripheral wall inner surface part of the premixing flow path 3 (inner surface part of a peripheral wall part of the tubular part 49), and the other ends of the first blade part 41a and the second blade part 41b are connected to each other with the partition wall part 40 sandwiched therebetween. As clearly shown in FIG. 7A and FIG. 7B, the first flow path 3a and the second flow path 3b have openings on left and right sides of the first blade part 41a and the second blade part 41b, and air is capable of passing through these openings. The first blade part 41a and the second blade part 41b have a first main surface part 42a and a second main surface part 42b as upward-facing surfaces facing a downstream side in the air flow direction, and at these portions, the first fuel gas outlet 80a and the second fuel gas outlet 80b are provided in an upward-facing opening shape.

In FIG. 4A, the pipe body joint part 70 forms therein a fuel gas receiving part 81 that receives supply of fuel gas from outside, and the fuel gas supplied to the fuel gas receiving part 81 is guided to the first fuel gas outlet 80a and the second fuel gas outlet 80b through openings 71a and 71b of the fuel gas control plate 71 and a first fuel gas flow path 8a and a second fuel gas flow path 8b.

Herein, the second fuel gas flow path 8b is provided inside the second blade part 41b, the pedestal part 44, and the first fuel gas flow path 8a is provided inside the first blade part 41a, the second blade part 41b, and the pedestal part 44. An up-down thickness of the second blade part 41b is configured to be greater than that of the first blade part 41a, and in the second blade part 41b, the first fuel gas flow path 8a and the second fuel gas flow path 8b overlap in the up-down height direction.

According to such a configuration, it is possible to simplify a fuel gas supply structure supplying fuel gas to the first fuel gas outlet 80a and the second fuel gas outlet 80b. Further, by overlapping the first fuel gas flow path 8a and the second fuel gas flow path 8b in the up-down height direction, it is possible to prevent a width (width L1 shown in FIG. 7B) in the horizontal direction of the second blade part 41b from becoming too large, and to sufficiently ensure an area of opening regions on left and right sides of the second blade part 41b.

Figure 3:
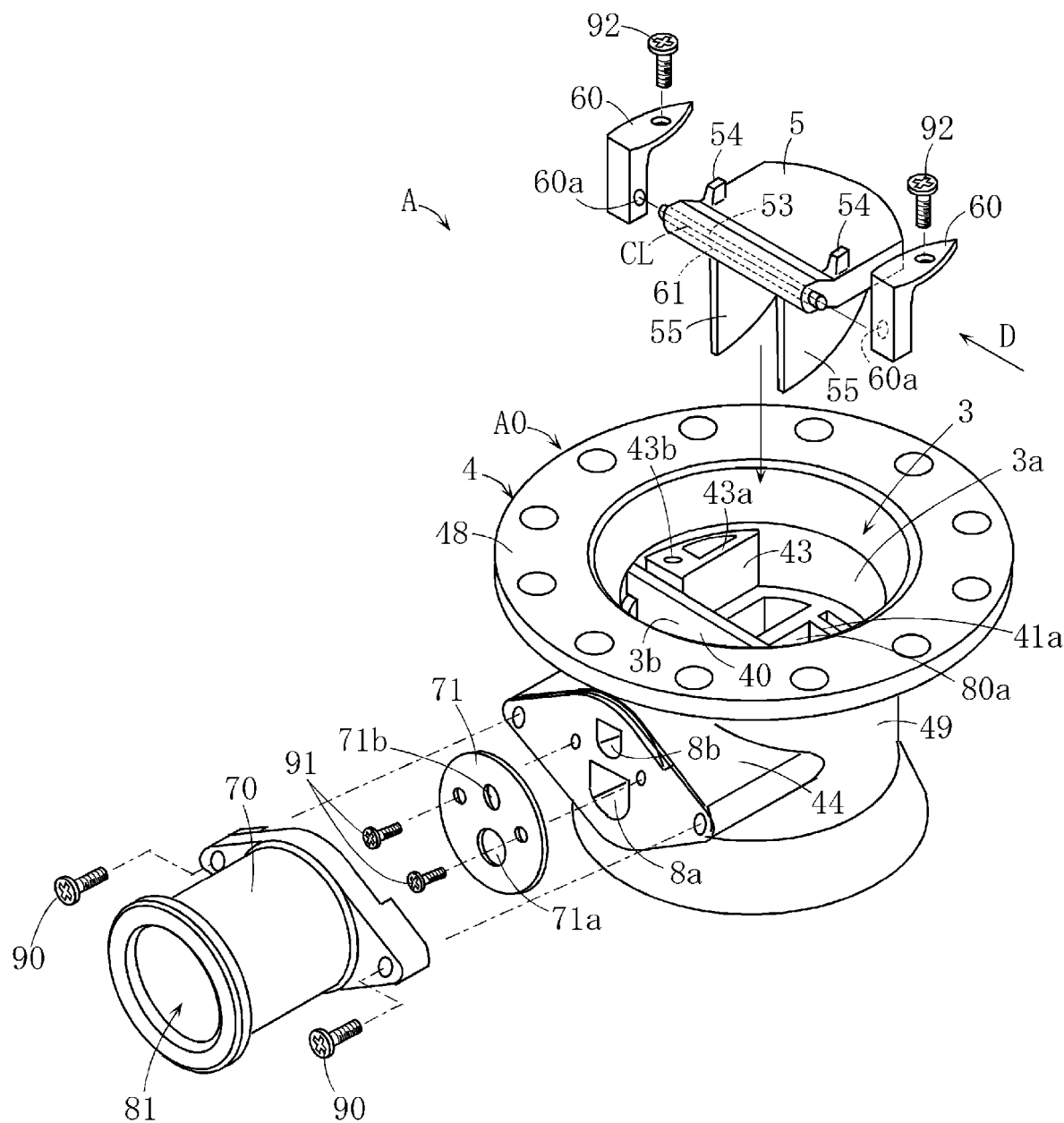
FIG. 3 is an exploded perspective view of FIG. 2.

As clearly shown in FIG. 3, the fuel gas control plate 71 is attached to the pedestal part 44 using a screw member 91 such as a screw, and has two openings 71a and 71b (on upper and lower sides) facing tip openings of the first fuel gas flow path 8a and the second fuel gas flow path 8b. The amount of fuel gas flowing in from the fuel gas receiving part 81 to the first fuel gas flow path 8a and the second fuel gas flow path 8b may be controlled depending on configured opening areas of the openings 71a and 71b. In this embodiment, as described above, since the volume of the second flow path 3b is configured to be smaller than that of the first flow path 3a, the second fuel gas outlet 80b and the upper-side opening 71b corresponding to the second flow path 3b are set to areas smaller than those of the first fuel gas outlet 80a and the lower-side opening 71a corresponding to the first flow path 3a.

By using the fuel gas control plate 71, it is possible to easily cope with changes in the gas type of the fuel gas. That is, a plurality of types of fuel gas control plates 71 are prepared, in which the openings 71a and 71b are set to opening areas respectively corresponding to a plurality of predetermined types of fuel gas. When assembling the premixing device A, it is convenient to select a fuel gas control plate 71 that corresponds to the type of fuel gas actually used, from among the plurality of types of fuel gas control plates 71.

Figure 4C:
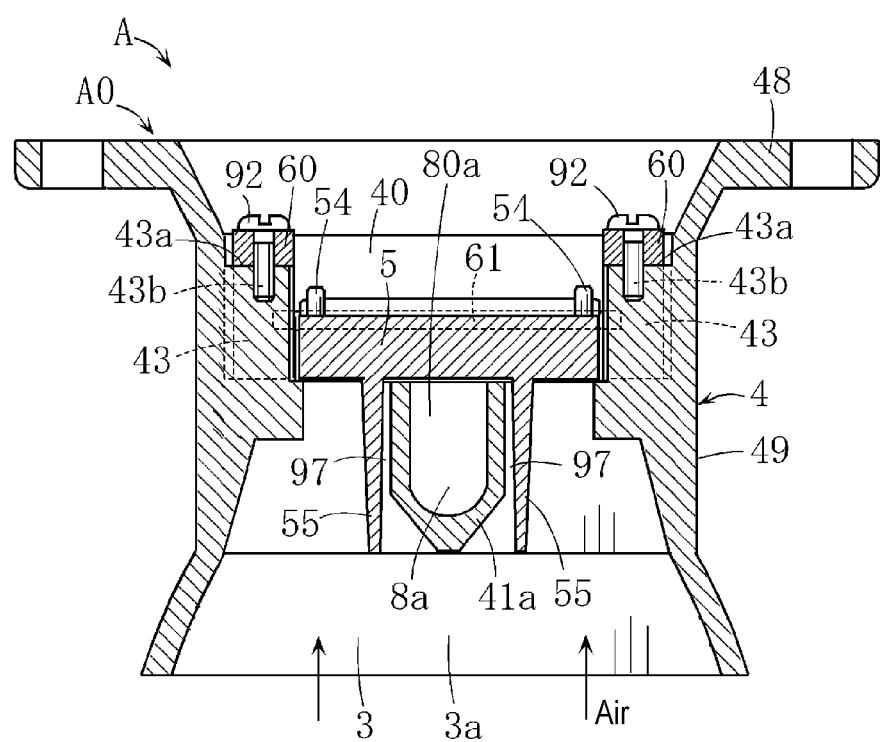
FIG. 4C is a cross-sectional view (right side main part cross-sectional view) of a main part taken along IVc-IVc in FIG. 4B.

The flapper 5 is, for example, a resin molded product and is arranged on an upper side (downstream side in the air flow direction) of the first blade part 41a in the first flow path 3a. Further, the flapper 5 is swingable in a direction opposed to the first main surface part 42a of the first blade part 41a to open and close the first flow path 3a and the first fuel gas outlet 80a at the same time (see FIG. 4A to FIG. 6B). An opening degree of the flapper 5 changes according to an air flow rate of the premixing flow path 3 such that the opening degree is smaller in the case where the air flow rate is low than in the case where the air flow rate is high. In the case where the air flow rate is low, the flapper 5 falls over due to its own weight and turns into a closed state as shown in FIG. 4A to FIG. 4C. As the air flow rate increases, the flapper 5 is lifted by an upward air flow and changes as shown in FIG. 5A to FIG. 6B, for example.

For example, the first fuel gas outlet 80a may be provided near an outer end (an end on a side opposite to the partition wall part 40) of the first blade part 41a. According to such a configuration, the first fuel gas outlet 80a can be opened and closed by a region near a tip of the flapper 5 (a region far from the shaft body 61, which is a swing center of the flapper 5), and it is possible to improve the sealing performance when the first fuel gas outlet 80a is in the closed state.

In FIG. 3, the pair of support members 60, as described above, are members that swingably support the flapper 5 using the shaft body 61. The shaft body 61 is inserted in a substantially horizontal direction through a hole part 53 provided at one end of the flapper 5. Each support member 60 is, for example, in a substantially L-shaped form in a side view and includes a recess 60a capable of fitting and holding an end of the shaft body 61. Further, the pair of support members 60 are attached to a pair of left and right protruding step parts 43 provided at the peripheral wall inner surface part of the first flow path 3a. As an attachment means thereof, for example, a screw hole 43b opened at an upper surface part 43a of each protruding step part 43, and a screw member 92 such as a screw that is screwed thereto are used. In this embodiment, the attachment of the support members 60 and the shaft body 61 is completed within the premixing flow path 3. Thus, it is not necessary to provide a hole part penetrating through the peripheral wall part of the premixing flow path forming member 4, and it is also not necessary to separately provide a sealing means for preventing mixed gas from leaking to outside from this hole part.

The pair of protruding step parts 43 are portions that partially protrude closer to the center of the first flow path 3a than a remaining general portion on the peripheral wall inner surface part of the first flow path 3a. Further, a height of the upper surface part 43a of each protruding step part 43 is configured to be greater than a height of the first main surface part 42a. As shown in FIG. 4A to FIG. 6B, the flapper 5 is provided to swing through a region between the pair of protruding step parts 43. In the state shown in FIG. 5A, the flapper 5 is opened in a semi-open state, and at that time, as shown in FIG. 5B, the pair of protruding step parts 43 are positioned on two sides of the flapper 5. Thus, air (and fuel gas) that has risen from below toward the flapper 5 is suppressed from flowing upward through two sides of the flapper 5.

A pair of fin parts 55 are integrally formed with the flapper 5. However, the embodiment is not limited thereto, and a pair of fin parts 55 formed separately may also be assembled to the flapper 5. As clearly shown in FIG. 8A to FIG. 8C, the pair of fin parts 55 protrude downward from a lower surface part of the flapper 5 in a form facing each other in parallel with a gap therebetween. In a front view of the flapper 5, for example, the fin part 55 has a sector shape of a quarter of a circle. Herein, the front view of the flapper 5 corresponds to FIG. 8B, which corresponds to a "view in a direction of a line of a swing center of the flapper" in the disclosure. The line of the swing center is, for example, a line of a reference sign CL in FIG. 3, and the view in the direction of the line of the swing center corresponds to, for example, a view in an arrow D direction in FIG. 3.

As shown in FIG. 4A to FIG. 4C, when the flapper 5 is in the closed state, the pair of fin parts 55 are provided in an arrangement of sandwiching left and right sides of the first fuel gas outlet 80a and the first blade part 41a.

Figure 5A:
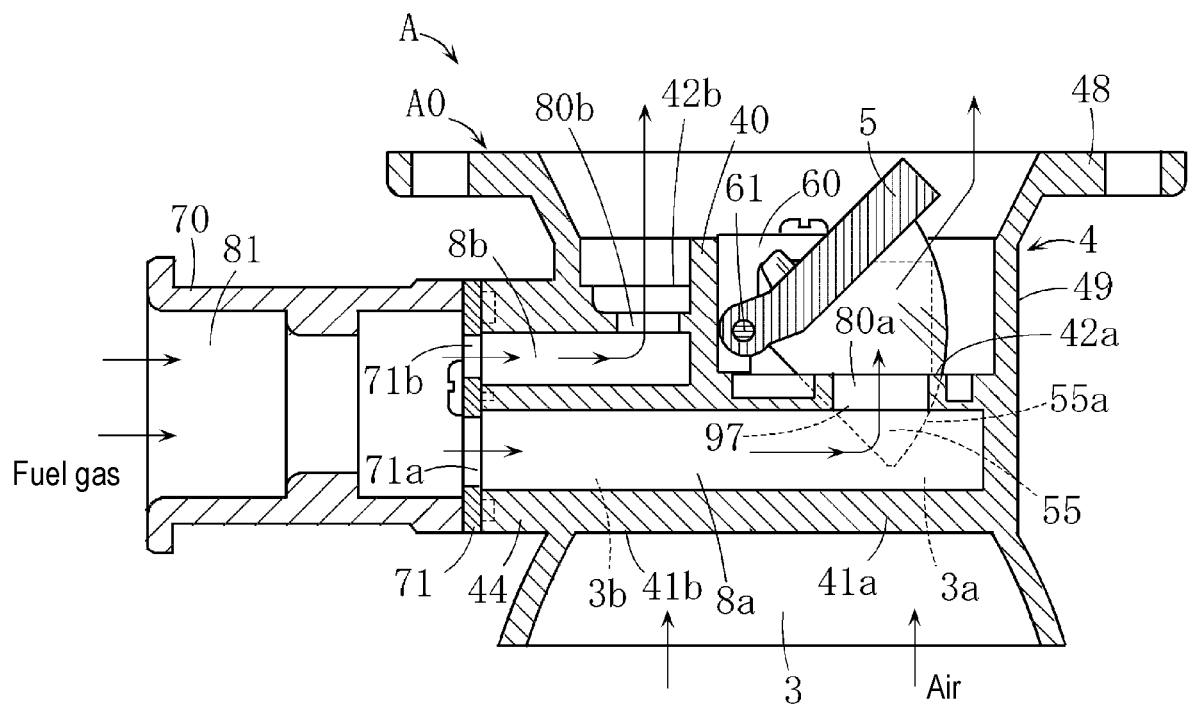
FIG. 5A is a front cross-sectional view showing a case where a flapper of the premixing device shown in FIG. 4A is in a semi-open state.
Figure 5B:
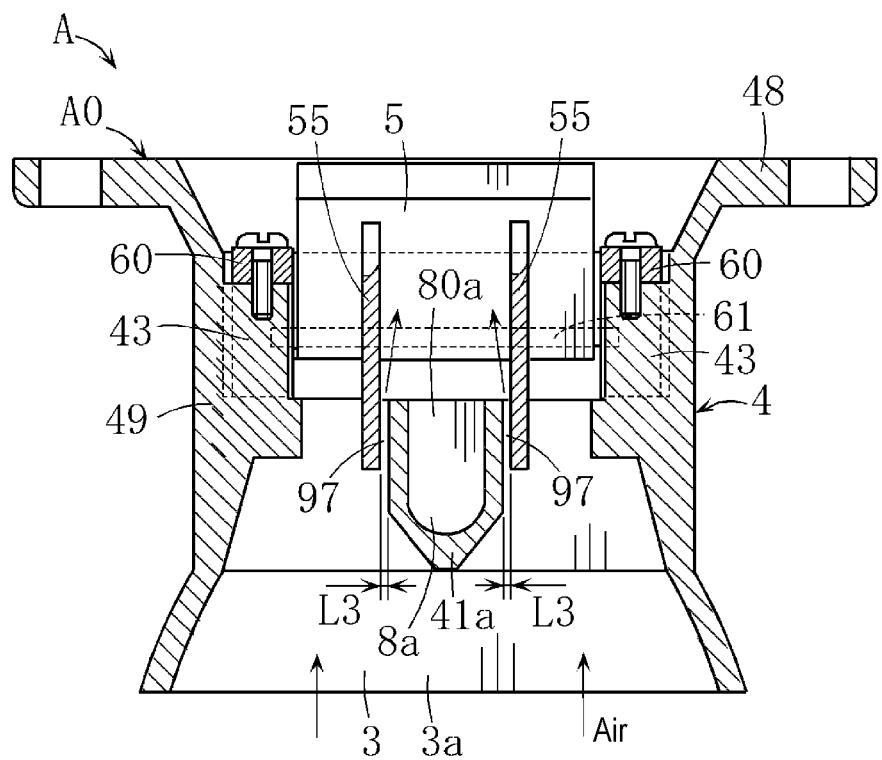
FIG. 5B is a right side main part cross-sectional view of FIG. 5A.

On the other hand, as shown in FIG. 5A and FIG. 5B, when the flapper 5 changes from the closed state to an open state, a gap 97 of a width L3 through which air is capable of passing is formed between the pair of fin parts 55 and the first blade part 41a. In FIG. 4A to FIG. 4C, the gap 97 is also formed (however, since the flapper 5 is in the closed state in FIG. 4A to FIG. 4C, air does not pass through the gap 97). As described above, each fin part 55 has a sector shape of a quarter of a circle in a front view, and a tip part 55a of the fin part 55 has an arc shape centered on the swing center (shaft body 61) of the flapper 5. A radius R of the arc shape is set to a dimension equal to or greater than a distance from the swing center (shaft body 61) to the first fuel gas outlet 80a (preferably, for example, a distance from the swing center to a farthest portion of the first fuel gas outlet 80a). According to such a configuration, in a process in which the flapper 5 changes from the closed state to the open state and its opening degree increases, it is possible to maintain the pair of fin parts 55 in the arrangement of sandwiching two sides of the first fuel gas outlet 80a and the first blade part 41a for a relatively long period of time. Further, it is also possible to prevent the size of the fin part 55 from becoming unnecessarily large.

Figure 6A:
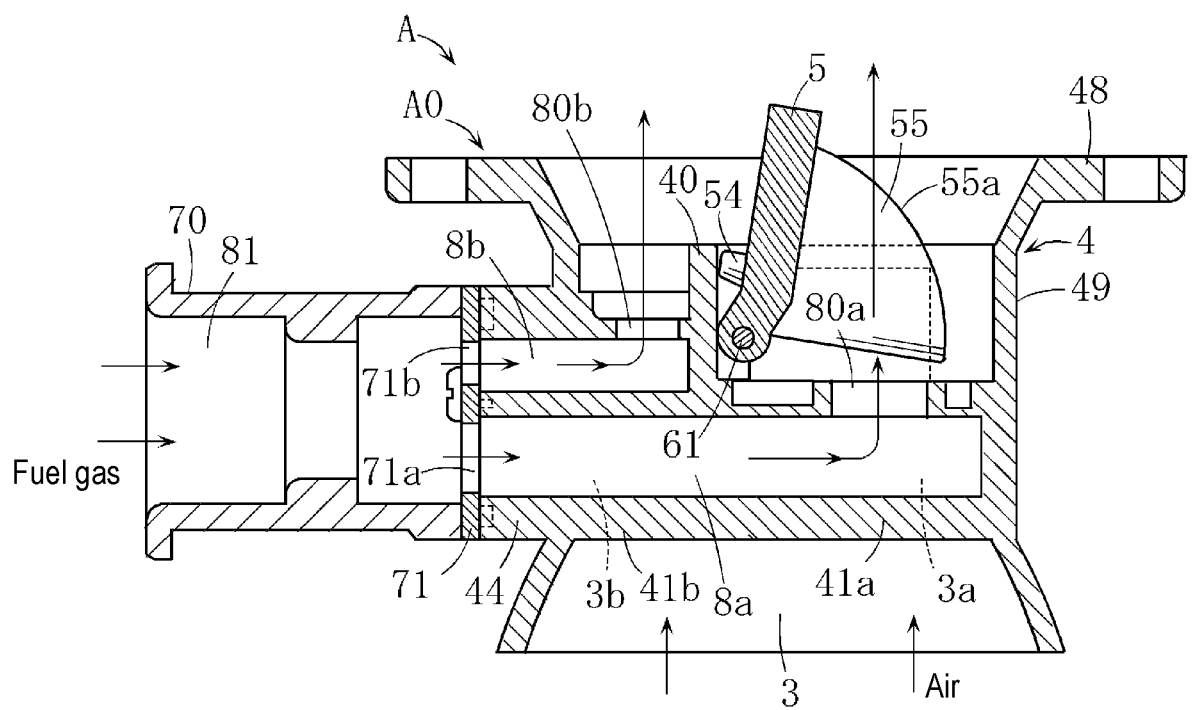
FIG. 6A is a front cross-sectional view showing a case where the flapper of the premixing device shown in FIG. 4A is in a fully open state.
Figure 6B:
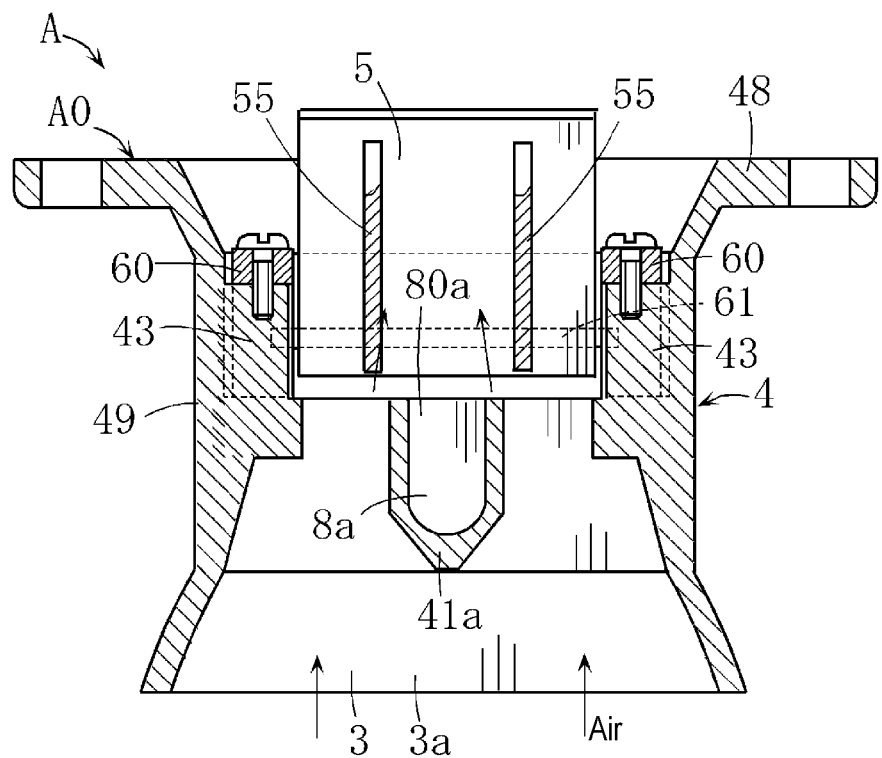
FIG. 6B is a right side main part cross-sectional view of FIG. 6A.

When the flapper 5 is in a fully open state, a protrusion 54 provided at the flapper 5 abuts against the partition wall part 40 and the flapper 5 is at an angle as shown in FIG. 6A and FIG. 6B. On the other hand, when the flapper 5 is at such an angle, each fin part 55 is positioned more upward than the first blade part 41a and is not present on two sides of the first blade part 41a.

Next, actions of the premixing device A described above and a combustion device B including the premixing device A will be described.

At the start of driving combustion of the burner 2 of the combustion device B or during general driving combustion thereafter, control on the driving combustion power of the burner 2 is performed by changing a driving speed of the fan 1 and changing a flow rate of the mixed gas supplied from the premixing device A to the burner 2. Herein, in the case where the driving speed of the fan 1 is a low speed and the air flow rate of the premixing flow path 3 is low, as shown in FIG. 4A to FIG. 4C, the flapper 5 turns into the closed state, air does not flow in the first flow path 3a, and air flows only in the second flow path 3b. Thus, it is possible to accelerate this air flow, apply a strong negative pressure to the second fuel gas outlet 80b, and cause an appropriate amount of fuel gas corresponding to the air flow rate to flow out to the second flow path 3b. In contrast, in the case where the driving speed of the fan 1 is a high speed, as shown in FIG. 5A to FIG. 6B, the flapper 5 turns into the open state, air flows in both the first flow path 3a and the second flow path 3b, and it is possible to cause an appropriate amount of fuel gas corresponding to the air flow rate to flow out from both the first fuel gas outlet 80a and the second fuel gas outlet 80b. For this reason, it is possible to increase a turndown ratio.

The flapper 5 not only opens and closes the first flow path 3a, but also opens and closes the first fuel gas outlet 80a at the same time. Thus, for example, when the first flow path 3a is in the closed state, since the first fuel gas outlet 80a is also in the closed state at the same time, issues such as unnecessary fuel gas outflow from the first fuel gas outlet 80a afterwards are properly prevented. As a means for achieving this, since two flappers respectively for the first flow path 3a and the first fuel gas outlet 80a are not used, it is possible to simplify the overall configuration of the premixing device A and reduce the production costs.

When the air flow rate of the premixing flow path 3 increases from less than a predetermined level to equal to or greater than the predetermined level, as described above, the flapper 5 changes from the closed state shown in FIG. 4A to FIG. 4C to the open state shown in FIG. 5A and FIG. 5B. At such a stage, unlike in this embodiment, for example, if the pair of fin parts 55 are not provided at the flapper 5, since an effective flow path area of the premixing flow path 3 suddenly changes (suddenly expands), the flow speed of the air flow in the second flow path 3b suddenly drops, and there is a risk that the mixed gas would suddenly change to a fuel lean mixing ratio. In contrast, according to this embodiment, when the flapper 5 is in the open state, since a part of the first flow path 3a is in a state blocked by the pair of fin parts 55, it is possible to obtain an effect similar to that of substantially suppressing a sudden change in the effective flow path area of the premixing flow path 3. As a result, it is possible to eliminate the risk described above and prevent the mixing ratio of the mixed gas from becoming an inappropriate fuel lean value.

The first fuel gas flow path 8a and the second fuel gas flow path 8b communicate with each other via the fuel gas receiving part 81. Thus, originally, when the flapper 5 changes from the closed state to the open state, there is a risk that the air of the first flow path 3a would flow back into the first fuel gas flow path 8a and the second fuel gas flow path 8b from the first fuel gas outlet 80a due to the negative pressure occurring in the second flow path 3b. In contrast, according to this embodiment, the pair of fin parts 55 generate resistance against such an air flow. Thus, the phenomenon of backflow is also suppressed, and it is possible to more reliably prevent the mixed gas from becoming an inappropriate fuel lean mixing ratio.

Further, at an intermediate stage from start of opening of the flapper 5 to the fully open state, the flapper 5 is at an angle as shown in FIG. 5A and FIG. 5B, for example. At such a stage, a fast air flow can be generated at the gap 97 between the pair of fin parts 55 and the first blade part 41a. This air flow occurs in a region close to two sides of the first fuel gas outlet 80*a*. Thus, a strong negative pressure can be applied to the first fuel gas outlet 80*a*, and it is possible to sufficiently ensure the outflow amount of fuel gas flowing out to the first flow path 3*a*. Thus, it is possible to more reliably prevent the mixed gas from becoming an inappropriate fuel lean mixing ratio.

In contrast, in the case where the flapper 5 is in the fully open state as shown in FIG. 6A and FIG. 6B, the pair of fin parts 55 are in an arrangement of being separated on the upper side of the first blade part 41*a*. According to this state, it is possible to suppress the pair of fin parts 55 from becoming air resistance, and it is possible to reduce pressure loss. When the flapper 5 is in the fully open state, since the flow speed of the air flow is sufficiently high, unlike the case shown in FIG. 5A and FIG. 5B, there is little or no need to generate a high-speed air flow using the fin part 55 and the first blade part 41*a*.

FIG. 9A to FIG. 10B show other embodiments of the disclosure. In these figures, the same or similar components as those in the above embodiment will be labeled with the same reference signs as those in the above embodiment, and repeated descriptions will be omitted.

Figure 8A:
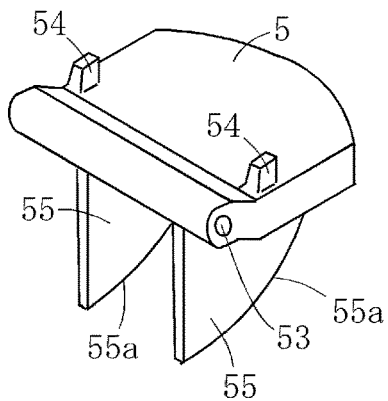
FIG. 8A is a perspective view of the flapper of the premixing device shown in FIG. 1 and FIG. 2.
Figure 8B:
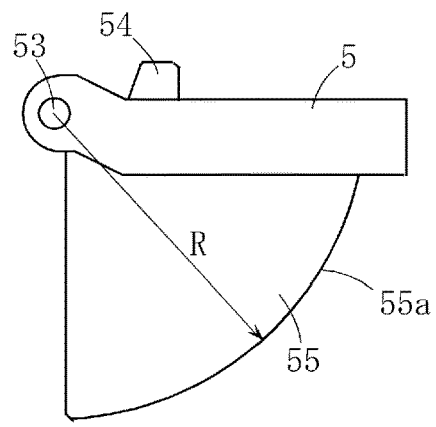
FIG. 8B is a front view thereof.
Figure 8C:
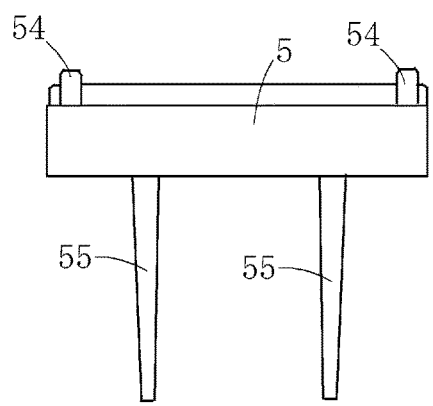
FIG. 8C is a right side view thereof.
Figure 9A:
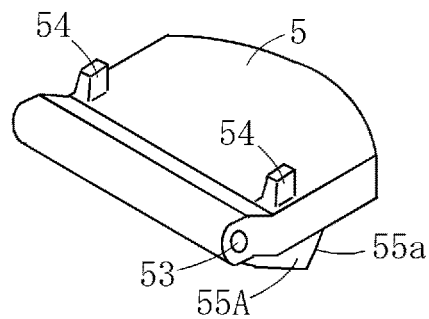
FIG. 9A is a perspective view showing another example of the flapper.
Figure 9B:
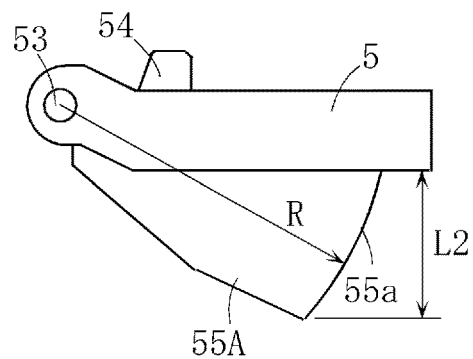
FIG. 9B is a front view thereof.
Figure 9C:
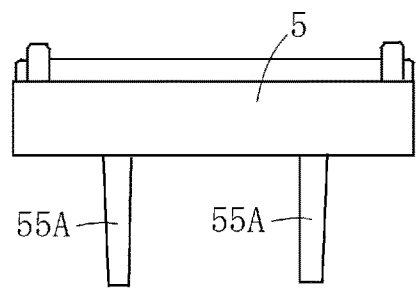
FIG. 9C is a right side view thereof.

A pair of fin parts 55A shown in FIG. 9A to FIG. 9C have a width L2 in the up-down height direction of the flapper 5 that is configured to be smaller than that of the fin parts 55 shown in FIG. 8A to FIG. 8C. According to such a configuration, in the case where the flapper 5 changes from the closed state to the open state and its opening degree increases, the fin part 55A separates from two sides of the first blade part 41*a* at a timing earlier than the fin part 55 shown in FIG. 8A to FIG. 8C. This contributes to preventing the fin part 55A from becoming air resistance and causing pressure loss.

In FIG. 8A to FIG. 9C, the entire tip part 55*a* of each fin part 55 and 55A has an arc shape of a predetermined radius R, but the disclosure is not limited thereto. The fin part in the disclosure may be configured such that only a part of the tip part near the flapper is configured as a predetermined arc shape, and the rest of the tip part is configured as a non-arc shape. Of course, the entire length region of the tip part of the fin part may also be configured as a non-arc shape.

Figure 10A:
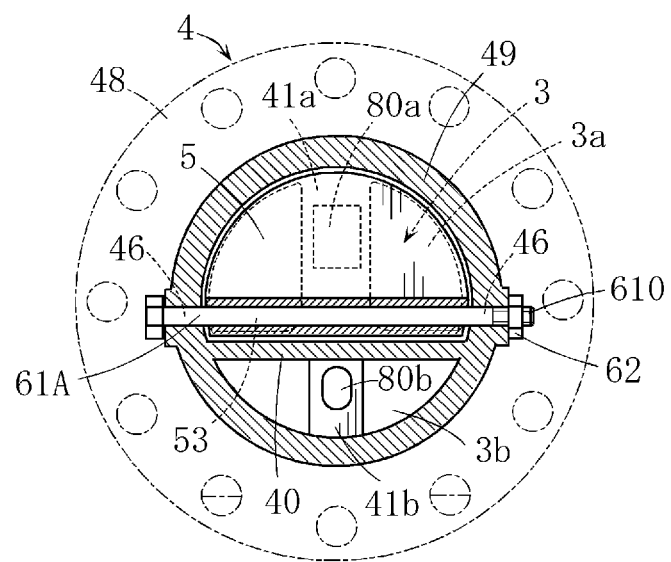
FIG. 10A is a plan cross-sectional view showing another example of the premixing device according to the disclosure.
Figure 10B:
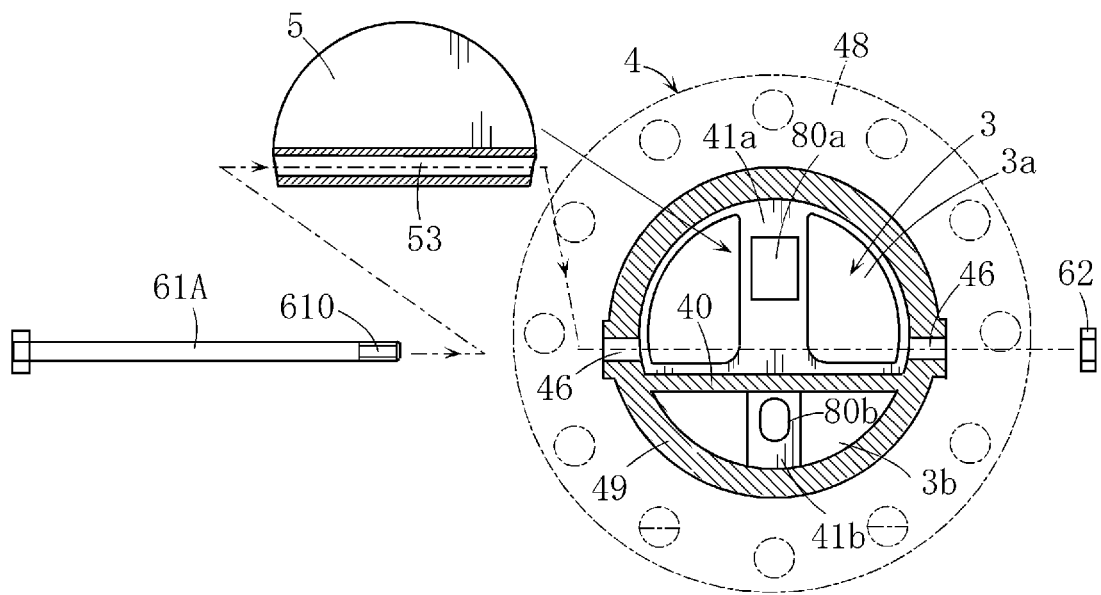
FIG. 10B is an exploded plan cross-sectional view of FIG. 10A.

In the embodiment shown in FIG. 10A and FIG. 10B, the flapper 5 is configured in a substantially semi-circular shape in a plan view, and a bolt-shaped shaft body 61A penetrates through the hole part 53 at one end of the flapper 5. The shaft body 61A is supported by being inserted into a pair of through holes 46 provided at the peripheral wall part of the tubular part 49 of the premixing flow path forming member 4. Further, the shaft body 61A is fixed to the premixing flow path forming member 4 by tightening a nut 62 screwed onto a screw part 61*O* provided at the tip part of the shaft body 61A, and the flapper 5 is swingable around the shaft body 61A. Although not shown, a sealing member for preventing mixed gas from leaking from inside the premixing flow path forming member 4 to outside is provided at an insertion spot of the shaft body 61A inserted into the through hole 46.

In this embodiment as well, similar to the above embodiment, it is possible to swingably support the flapper 5 appropriately with a simple configuration. In the disclosure, as a means for configuring the flapper to be swingable, instead of using a shaft body made of metal separately from the flapper, for example, a protrusion that serves as the swing center of the flapper may be provided at one of the flapper and a support member of the flapper, and a recess into which the protrusion fits may be provided at the other of the flapper and the support member.

The disclosure is not limited to the contents of the embodiments described above. The specific configuration of each part of the premixing device and the combustion device according to the disclosure may be subjected to various possible design changes within the scope intended by the disclosure.

Although it is preferable that the premixing flow path has a Venturi shape, for example, the embodiment is not limited thereto. The specific shapes, sizes, materials, etc. of the first blade part, the second blade part, the flapper, the pair of fin parts, etc. are not limited to the embodiments described above. It is also possible that each of the first fuel gas outlet and the second fuel gas outlet is not one fuel gas outlet, but is provided as a plurality of fuel gas outlets, for example.

The fuel gas may be, for example, natural gas or LP gas, but its specific type is not particularly limited. The combustion device according to the disclosure is not limited to the use in a hot water apparatus, but may also be used as a combustion device for other applications such as room heating and incineration. Further, the combustion device is not limited to the type that causes combustion gas to move downward, but may also be of a type that causes the combustion gas to move upward, for example.

What is claimed is:

1. A premixing device comprising:
   a premixing flow path to which air is supplied from outside and which serves to mix fuel gas with the air to generate a mixed gas;
   a partition wall part that partitions the premixing flow path into a first flow path and a second flow path arranged side by side in a direction intersecting with an air flow direction; and
   a first fuel gas outlet and a second fuel gas outlet from which fuel gas is capable of flowing out to the first flow path and the second flow path using a negative pressure generated by an air flow in the first flow path and the second flow path,
   the premixing device further comprising:
   a first blade part that is provided in the first flow path and comprises the first fuel gas outlet provided facing a downstream side in the air flow direction;
   a flapper that is arranged on the downstream side of the first blade part in the air flow direction in the first flow path, is capable of swinging to open and close both the first flow path and the first fuel gas outlet, and has an opening degree which changes according to an air flow rate of the premixing flow path such that the opening degree is smaller in a case where the air flow rate is low than in a case where the air flow rate is high; and
   a pair of fin parts that are provided to protrude at the flapper in an arrangement of sandwiching the first fuel gas outlet and the first blade part in a direction intersecting with the air flow direction, the pair of fin parts forming a gap with respect to the first blade part through which air is capable of passing.

2. The premixing device according to claim 1, wherein in a view in a direction of a line of a swing center of the flapper, a tip part of each of the fin parts in at least a region near the flapper has an arc shape centered on the swing center, and a radius of the arc shape is equal to or greater than a distance from the swing center to the first fuel gas outlet.

3. The premixing device according to claim 1, wherein in a fully open state of the flapper, each of the fin parts is positioned on the downstream side of the first blade part in the air flow direction and is not present on two sides of the first blade part.

4. The premixing device according to claim 1, further comprising:
- a protruding step part that is provided at a peripheral wall inner surface part of the first flow path and partially protrudes closer to a center of the first flow path than a remaining general portion of the peripheral wall inner surface part; and
- a support member that is attached to the protruding step part to be arranged in the first flow path, and swingably supports the flapper.

5. The premixing device according to claim 1, further comprising:
- a premixing flow path forming member that forms the premixing flow path;
- a second blade part that is provided in the second flow path with one end connected to a peripheral wall part of the premixing flow path forming member and another end connected to the first blade part via the partition wall part, and comprises the second fuel gas outlet provided facing the downstream side in the air flow direction;
- a fuel gas receiving part that is provided at the peripheral wall part of the premixing flow path forming member and receives supply of fuel gas from outside;
- a second fuel gas flow path that is provided in the second blade part in a manner capable of guiding a part of the fuel gas supplied to the fuel gas receiving part to the second fuel gas outlet; and
- a first fuel gas flow path that is provided to extend from inside the second blade part to inside the first blade part in a manner capable of guiding another part of the fuel gas supplied to the fuel gas receiving part to the first fuel gas outlet.

6. The premixing device according to claim 5, wherein a thickness of the second blade part in the air flow direction is greater than that of the first blade part, and the first fuel gas flow path and the second fuel gas flow path are provided in an arrangement of overlapping with each other in the air flow direction in the second blade part.

7. A combustion device comprising:
a fan;
a premixing device that is provided on an air suction side of the fan, generates a mixed gas obtained by mixing air and fuel gas, and sends the mixed gas to the fan; and
a burner that receives supply of the mixed gas from the fan and burns the fuel gas, wherein
the premixing device according to claim 1 is used as the premixing device.

8. A combustion device comprising:
a fan;
a premixing device that is provided on an air suction side of the fan, generates a mixed gas obtained by mixing air and fuel gas, and sends the mixed gas to the fan; and
a burner that receives supply of the mixed gas from the fan and burns the fuel gas, wherein
the premixing device according to claim 2 is used as the premixing device.

9. A combustion device comprising:
a fan;
a premixing device that is provided on an air suction side of the fan, generates a mixed gas obtained by mixing air and fuel gas, and sends the mixed gas to the fan; and
a burner that receives supply of the mixed gas from the fan and burns the fuel gas, wherein
the premixing device according to claim 3 is used as the premixing device.

10. A combustion device comprising:
a fan;
a premixing device that is provided on an air suction side of the fan, generates a mixed gas obtained by mixing air and fuel gas, and sends the mixed gas to the fan; and
a burner that receives supply of the mixed gas from the fan and burns the fuel gas, wherein
the premixing device according to claim 4 is used as the premixing device.

11. A combustion device comprising:
a fan;
a premixing device that is provided on an air suction side of the fan, generates a mixed gas obtained by mixing air and fuel gas, and sends the mixed gas to the fan; and
a burner that receives supply of the mixed gas from the fan and burns the fuel gas, wherein
the premixing device according to claim 5 is used as the premixing device.

12. A combustion device comprising:
a fan;
a premixing device that is provided on an air suction side of the fan, generates a mixed gas obtained by mixing air and fuel gas, and sends the mixed gas to the fan; and
a burner that receives supply of the mixed gas from the fan and burns the fuel gas, wherein
the premixing device according to claim 6 is used as the premixing device.

* * * * *